Patented Oct. 13, 1953

2,655,519

UNITED STATES PATENT OFFICE 2,655,519

PROCESS OF PREPARING AMINO-COMPOUNDS OF THE STEROID SERIES

Josef Schmidt-Thomé, Frankfurt am Main Unterliederbach, Germany, assignor to Farbwerke Hoechst Aktiengesellschaft vormals Meister Lucius und Brüning, Frankfurt am Main Höchst, Germany, a company of Germany No Drawing. Application March 22, 1952, Serial No. 278,131. In Germany March 30, 1951

4 Claims. (Cl. 260—397.5)

The present invention relates to a process for subjecting 20-oximes of the steroid series to the Beckmann re-arrangement.

U. S. specification No. 2,212,363 describes a process in which compounds of the cyclopentanopolyhydrophenanthrene series containing in the 17-position the group

are subjected to the Beckmann re-arrangement. The re-arrangement is brought about by treating the oxime with thionyl chloride in solution in benzene. There are also mentioned as re-arrangement agents phosphorus pentachloride and sulphuric acid.

Under these conditions the Beckmann re-arrangement takes place in an extremely non-unitary manner and it is not possible to isolate the desired 17-acetylamino-compounds from the reaction mixture. By the process of the aforesaid specification the reaction products are subjected to hydrolysis in an acid medium. In this manner the 17-amines are obtained in a yield of at most 30 per cent.

In U. S. specification No. 2,531,441 is described a process for making amines of the cyclopentanopolyhydrophenanthrene series by treating paratoluene sulphonates of 20-oximes with alcohols, primary or secondary amines, amino-alcohols or diamines. In this case the course of the reaction is apparently different from that in the Beckmann re-arrangement. In Example 19 of the aforesaid U. S. specification 3β-acetoxy-Δ⁵-pregnene-20-one-oxime in pyridine is treated with para-toluene sulphonic acid chloride. The toluene sulphonate of the oxime is formed. The reaction mixture is poured into a mixture of ice and sulphuric acid. If the product is extracted with benzene and ether, the para-toluene sulphonate can be isolated as described in Example 2 of that specification. Thus, no re-arrangement has yet occurred. In the process described in Example 19 of that specification, the para-toluene sulphonate is not isolated, and the reaction mixture is heated for a short time on a steam bath. It has been established that re-arrangement takes place during this heating of the para-toluene sulphonate with dilute sulphuric acid. However, the simultaneous partial hydrolysis of the acetyl group in the 3-position cannot be avoided. Therefore, 3β-acetoxy-17-acetylamino-Δ⁵-androstene is not isolated in Example 19, but by subsequent treatment with a solution of potassium hydroxide in methanol the acetyl group in the 3-position is completely hydrolysed, and 3β-hydroxy-17-acetylamino-Δ⁵-androstene is obtained.

Now, I have found that, if a mixture of phosphorus oxychloride and pyridine is used, the re-arrangement of 20-oximes of the steroid series, which contain a hydroxyl group or an acetylated hydroxyl group as a substituent in the 3-position of the cyclopentano - polyhydrophenanthrene radical, into the corresponding 17-acetylamines occurs almost quantitatively.

The re-arrangement can be carried out within a wide temperature range, for example, at a temperature from —20° C. to +100° C. It is of advantage to work at a temperature below room temperature, especially from 0° to —20° C.

The ratio of phosphorus oxychloride to pyridine may vary within wide limits, for example from 1:20 to 1:2. An advantageous method of carrying out the reaction is as follows:

Into a solution of the oxime in pyridine is introduced dropwise a mixture of phosphorus oxychloride and pyridine (in a ratio of 1:15), while stirring and cooling with ice and sodium chloride, and the reaction mixture is allowed to stand for a few hours at 0° C.

When the steroid to undergo re-arrangement contains an alcoholic hydroxyl group, such group may be protected by acylation, but this is not absolutely necessary. Thus, for example, 3β-hydroxy-Δ⁵-pregnene-20-one-oxime can be re-arranged directly by means of phosphorus oxychloride and pyridine without the hydroxyl group in the 3-position being attacked to any appreciable extent. It is remarkable that no splitting off worth mentioning of water or phosphorylation is caused by the action of the phosphorus oxychloride. In the present invention 17-acetyl-amino-compounds of the steroid series are formed by the Beckmann re-arrangement.

The following examples serve to illustrate the invention but they are not intended to limit it thereto:

Example 1

5 grams of 3β-acetoxy-Δ⁵-pregnene-20-one-oxime are dissolved in 20 cc. of dry pyridine. After cooling with a freezing mixture, a cooled mixture of 30 cc. of pyridine and 10 cc. of phosphorus oxychloride is added dropwise to the solution, while stirring, and the mixture is then allowed to stand for 3 hours at 0° C., whereby it gradually assumes a dark coloration, and fine needles, probably of pyridine hydrochloride, separate. Without regard to these crystals, the reaction mixture is poured into a mixture of ice and 70 cc. of concentrated hydrochloric acid, whereby a precipitate separates. After standing for some time, the precipitate is filtered off and washed with water. The crude product so obtained is recrystallised from methanol to yield 4.74 grams of 3β-acetoxy-17-acetyl-amino-Δ5-androstene melting at 187° C. to 190° C., which corresponds to 95 per cent. of the theoretical yield. After repeated recrystallisation from dilute alcohol, small crystals are obtained which melt at 193° C. (uncorrected).

*Example 2*

1 gram of 3-hydroxy-Δ5-pregnene-20-one-oxime is re-arranged in the manner described in Example 1 with phosphorus oxychloride and pyridine, and then worked up. The crude product is dissolved in alcohol, 100 milligrams of a sparingly soluble substance remaining undissolved. By concentration with evaporation and the gradual addition of water, 600 milligrams of 3β-hydroxy-17-acetylamino-Δ5-androstene crystallise, which, after the recrystallisation from dilute alcohol, is obtained in the form of lamellae melting at 268° C.–271° C. (uncorrected).

*Example 3*

300 milligrams of 3β-acetoxy-allo-pregnene-20-one-oxime are dissolved in 4 cc. of pyridine, a mixture of 1.6 cc. of phosphorus oxychloride and 4 cc. of pyridine is added, and the mixture is allowed to stand for 2 hours at 0° C. The reaction solution is poured into a mixture of ice and 11 cc. of concentrated hydrochloric acid, the product, which separates in the form of flakes, is filtered off after having been allowed to stand for 1½ hours, and is then washed with water. 290 milligrams of crude 3β-acetoxy-17-acetyl-amino-androstane are obtained, the yield being 97 per cent. of the theoretical yield. After a treatment with animal charcoal, the product is recrystallised from dilute alcohol. A pure 3β-acetoxy-17-acetylamino-androstane is obtained melting at 195–196° C. (uncorrected).

I claim:

1. The process of producing amino-compounds of the steroid series which comprises acting phosphorus oxychloride and pyridine upon 20-oximes of the formula

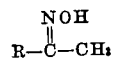

wherein R is a cyclopentanopolyhydrophenanthrene radical which is substituted in position 3 by a member of the group consisting of hydroxyl and acylated hydroxyl thus effecting a Beckmann re-arrangement.

2. The process according to claim 1, which comprises acting phosphorus oxychloride and pyridine upon 3β-acetoxy-Δ5-pregnene-20-one-oxime.

3. The process according to claim 1, which comprises acting phosphorus oxychloride and pyridine upon 3β-hydroxy-Δ5-pregnene-20-one-oxime.

4. The process according to claim 1, which comprises acting phosphorus oxychloride and pyridine upon 3β-acetoxy-allo-pregnane-20-one-oxime.

JOSEF SCHMIDT-THOMÉ.

No references cited.